Oct. 20, 1942.    E. S. MacPHERSON    2,299,160
HYDRAULIC BRAKE HOSE
Filed May 31, 1941

Inventor
Earle S. MacPherson
By
Blackmore, Jemes & Flint
Attorneys

Patented Oct. 20, 1942

2,299,160

UNITED STATES PATENT OFFICE 2,299,160

HYDRAULIC BRAKE HOSE

Earle S. MacPherson, Detroit, Mich., assignor to General Motors Corporation, Detroit, Mich., a corporation of Delaware Application May 31, 1941, Serial No. 395,989

2 Claims. (Cl. 285—8)

This invention relates to hydraulic brake hose, such hose as is used to connect the brake fluid carrying conduit on a vehicle frame with the braking applying motor associated with a wheel.

It is an object of the invention to improve such a hose by adding to its tensile strength.

Another object is the accomplishment of the major object by means which shall be efficient, simple and comparatively inexpensive.

Figure 1 of a drawing shows in plan view the novel hose assembled on the vehicle.

The hose ordinarily used gives satisfactory service but under unusual driving conditions it may fail. One such condition is encountered when objects on the ground engage the hose and apply to it a force greater than can be resisted by the rubber composition of which the hose is manufactured.

Figure 1:
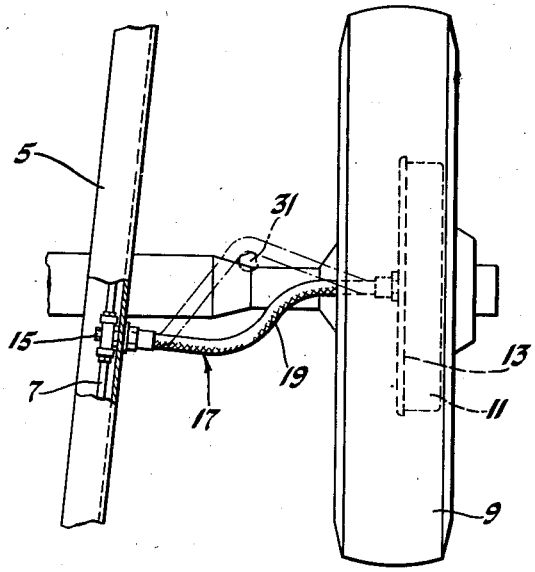
Figure 2:
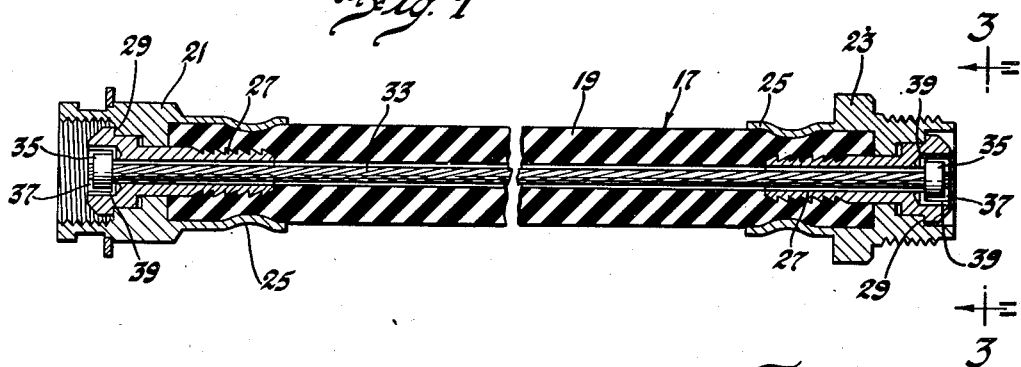
Figure 2 is a longitudinal section of the hose.

In Figure 1 there is shown a vehicle frame 5, carrying the conduit 7 for hydraulic brake fluid. The fluid conduit is connected to a conventional master cylinder, not shown. At 9 there is illustrated a wheel having a brake drum 11. The drum is covered by a backing plate 13. The plate serves as usual as an anchor for brake shoes, not shown, and as the support for a fluid motor, also not shown, for spreading the shoes into contact with the drum. At 15 is a coupling in conduit 7 and between the coupling and the fluid motor and connected to both is a hose marked 17. As is usual this hose is made from heavy reinforced rubber, the tube being marked 19. The rubber hose is sufficiently strong to resist internal pressure. It carries fittings 21 and 23 at its ends for connection to coupling 15 and the braking applying motor. Each fittings is formed with a sleeve portion 25 cooperating with an internal tubular nipple 27 to grip the rubber hose. Each fitting has a shoulder 29 to engage part of the nipple.

The construction of hose thus far described is substantially conventional. In driving over rough country it may happen that an obstruction such as that marked 31 in Figure 1 contacts the rubber hose. The tensile strength of the hose may not be sufficient to overcome the force exercised by the obstruction and the hose may fail. Under such circumstances the hydraulic brake system is rendered useless and braking must be accomplished by such as emergency system as the vehicle may carry.

Figure 3:
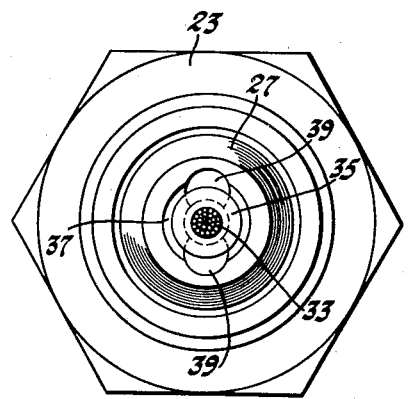
Figure 3 is an enlarged end view as seen in lines 3—3 of Figure 2.

To overcome this difficulty the hose of this invention has a flexible metal cable 33, preferably of spirally wound strands extending through its central passage. This cable is anchored to the two end fittings. Such a strengthening cable is intended to provide the necessary resistance to overcome the force applied thereto by the obstruction. The passageway is now annular in cross section and the dimensions of the rubber tubes and fittings are chosen so that the area of the annulus is sufficient for the purpose. It may be substantially the same as the cross-sectional area of the conventional hose with a passageway circular in section. To each end of the cable is secured in any way found convenient a collar 35. Each collar is positioned within the recess 37 at the end of the nipple and may contact the bottom of the recess. To permit the flow of fluid around the collar and to and from the rubber hose there may be bored passages 39 as best shown in Figure 3. These borings enlarge the area of the recess around the collar and their lower ends extend beneath the seat upon which the collar is adapted to rest. By this means the flow of fluid is insured and the hose is enabled to overcome many an obstruction which would otherwise render useless the hydraulic brake system.

I claim:

1. Hydraulic hose including a hollow tube of deformable material having attaching fittings of metal at its ends, each of said fittings comprising an outer tubular element and an inner tubular nipple adapted to be assembled within said outer element, said hollow deformable tube adapted to be clamped between said outer element and nipple the remote ends of said nipples being internally recessed to form shoulders and a flexible cable extending through said deformable tube and having terminal abutments engaging said shoulders.

2. The invention defined by claim 1 together with eccentric borings in the bases of said recesses to afford communication between the recesses and the passages through the nipple when the abutments are seated on the shoulders.

EARLE S. MacPHERSON.